Aug. 18, 1959     H. S. DARLINGTON, JR     2,899,705
METHOD AND APPARATUS FOR THE MOLDING OF THREADED ARTICLES
Filed July 6, 1956
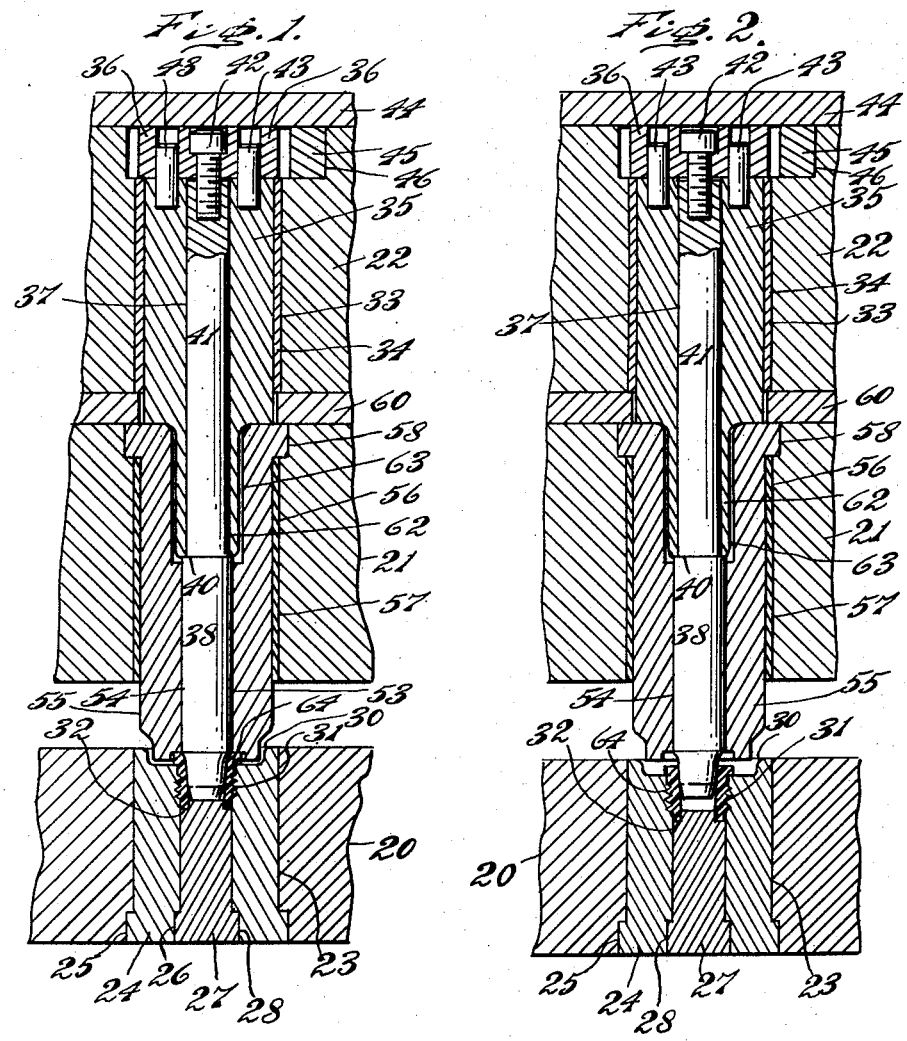

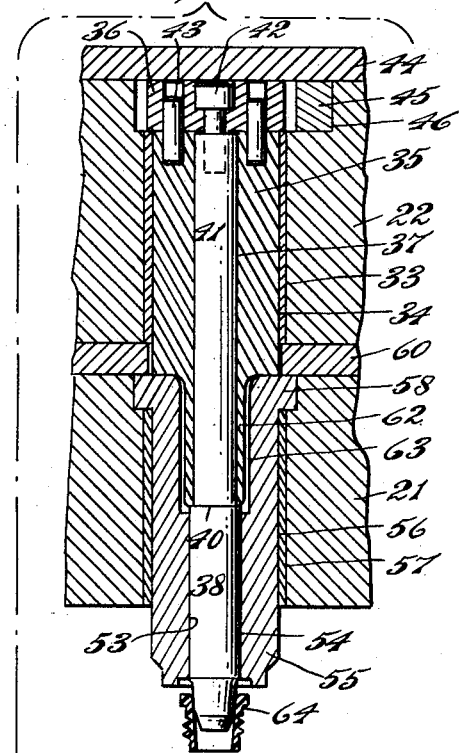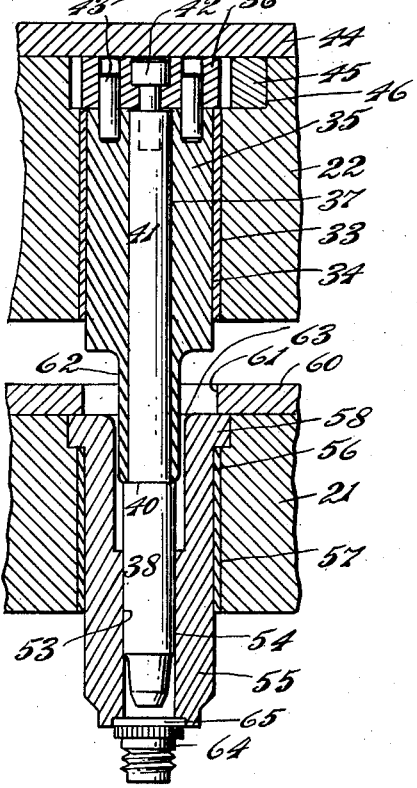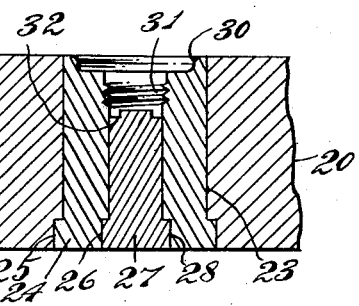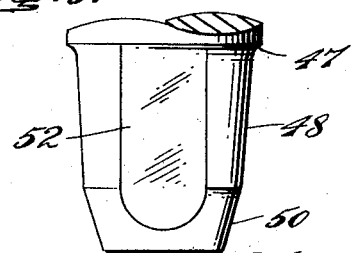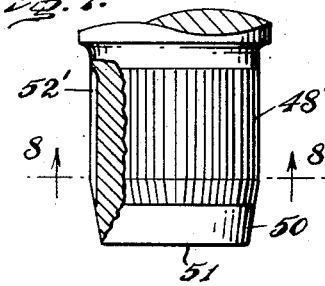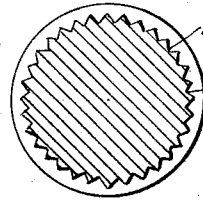

United States Patent Office 2,899,705
Patented Aug. 18, 1959

2,899,705

METHOD AND APPARATUS FOR THE MOLDING OF THREADED ARTICLES

Henry S. Darlington, Jr., Media, Pa., assignor to A. H. Wirz, Inc., Chester, Pa., a corporation of Pennsylvania Application July 6, 1956, Serial No. 596,189

5 Claims. (Cl. 18—2)

The present invention relates to molding of threaded objects suitably from plastics, which may, for example, be phenolformaldehyde, polyethylene, urea-formaldehyde, polystyrene or other suitable plastic materials.

A purpose of the invention is to facilitate the removal of a threaded molded object from the threads of the mold without damage to the object.

A further purpose is to permit employment of relatively deep threads without danger of damaging them during stripping or ejecting.

A further purpose is to maintain the molded object in engagement with a sliding interlock on the force pin and to rotate the force pin as the mold parts separate to remove the molded object from the threads of the mold.

A further purpose is to eject or strip the molded object from the force pin by relative movement of a force body surrounding the force pin.

A further purpose is to move a stripper plate first away from the force pins, then toward the force pin and then away from the force pin to eject the work.

A further purpose is to rotate the force body with the force pin so as to avoid possible damage to the molded object by rubbing against the force body when the force pin is rotated.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Describing in illustration but not in limitation and referring to the drawings:

Figure 1 is a central axial section through one mold cavity position illustrating the mold parts in molding position.

Figure 2 is a view corresponding to Figure 1 showing the beginning of separation of the mold parts.

Figure 3 is a view similar to Figure 1 showing the completion of unthreading of the molded object from the cavity.

Figure 4 is a view similar to Figure 1 showing the stripping of the molded object.

Figure 5 is an enlarged fragmentary side elevation of the end of one form of force pin showing the interlocks.

Figure 6 is a bottom plan view of the force pin of Figure 5 showing the sliding interlocks.

Figure 7 is a view similar to Figure 5 of a preferred form of force pin.

Figure 8 is a section of Figure 7 on the line 8—8.

The present invention is concerned with the molding of threaded plastic objects, a typical example being a collapsible tube neck insert which is intended to form the neck portion of the collapsible tube, and to be suitably joined to the body portion of the tube.

In the prior art practice in forming objects of this character, it has been usual to employ very shallow threads, and simply strip axially without unscrewing, the threads having sufficient elasticity because of their shallowness to strip without tearing. In the collapsible tube thus produced, however, the shallowness of the threads makes them vulnerable to crossing of threads, jamming or thread stripping when the cap is applied, especially by an inattentive person who does not axially align the cap.

In accordance with the present invention it is possible to use deeper and stronger threads on the molded object, and still remove them from the mold without difficulty.

The general assembly of the device employed in the present invention may be similar to that of Lay, U.S. Patent 2,587,337, granted February 26, 1952, for Molding Threaded Objects, and accordingly the present application illustrates the detail of the mold parts themselves, it being understood that each of the mold plates is provided with suitable operative cylinders and rams of well known character, which may be similar to those of the Lay patent.

The mold parts in accordance with the invention comprise a cavity plate 20 moved up and down by a suitable mechanism such as a cylinder and ram, not shown, a stripping plate 21 independently moved up and down by a suitable mechanism such as a cylinder and ram, not shown, and a force plate 22 which may suitably be stationary.

It will be understood, of course, that the mold will ordinarily be a multiple cavity mold having many duplications of the mold parts shown, but it will be sufficient for the present invention to illustrate one such set of mold parts.

The cavity plate 20 at each cavity position has a shouldered bore 23 extending vertically and receiving mold cavity parts rigidly held in the cavity plate and consisting of a cavity ring 24 fitting in the opening 23, having a shoulder 25 which locks in the shoulder of the opening 23, and having a central shouldered opening 26 which receives and holds a cavity insert 27 having a shoulder 28 which locks the insert in position. All of these parts are supported from below by a moving press platen, not shown.

The cavity ring at its upper end has an annular recess 30 which cooperates with the lower end of the force body, and a female thread 31 which forms the thread on the molded object. The insert at the top has an annular recess 32 which forms the lower end of the molded object in cooperation wtih the force pin.

The force plate 22 has an axial circular opening 33 which receives a pressed-in suitably nonferrous bushing 34 which journals the hub portion 35 of a force rotating gear which has a pinion portion 36. The hub portion 35 is externally cylindrical and has a central circular opening 37 which receives a force pin 38. The force pin has a shoulder 40 and a reduced diameter at 41 inside the hub 35, and the force pin terminates just short of the pinion, the force pin being held in place and the pinion portion and hub portions of the gear being held together as a rigid unit by machine screw 42 passing through a countersunk hole in the pinion and threaded into the upper end of the force pin. Pins 43 extend through openings in the pinion portion and the hub portion and prevent relative rotation of these parts. The pinion portion is prevented from moving endwise by a cover plate 44 which is secured to the force plate by any suitable means, as by screws, not shown.

The pinion meshes with a rack 45 which reciprocates in a direction perpendicular to the paper in a slot 46 under the action of suitable mechanism as shown in the Lay patent aforesaid.

In the form of Figures 5 and 6, the force pin at its lower end has an annular fillet 47 and a tapered portion 48 below the fillet, terminating in a more abruptly tapered portion 50 at the bottom and ending in a flat end 51 which suitably cooperates with the insert 27 in closed position of the mold.

On diametrically opposite positions the force pin has slots or flats 52 which extend over the tapered portion 48 and down over part of the tapered portion 50 and provide a slidable interlock between the molded object and the force pin.

In a preferred construction of the force pin, the portion 48' is made cylindrical and knurled at 52' as shown in Figures 7 and 8, omitting the flats 52.

Between the shoulder 40 and the fillet 47 the force pin has a cylindrical portion 53 which is received in a central circular hole 54 of a cylindrical force body 55. The force body externally journals in a suitably nonferrous bushing 56 pressed in a hole 57 of the stripper plate 21. The hole is shouldered at the top and a shouldered portion 58 at the top of the force body engages the shoulder portion of the hole and prevents movement of the force body downward with respect to the stripper plate. A stripper plate cover 60 secured to the stripper plate, as by bolts not shown, limits the force body against movement upward with respect to the stripper plate. The cover 60 has an enlarged hole 61 which receives the lower cylindrical end of the gear hub.

The gear hub has a square downward extension 62 around the force body which engages in a squared slot 63 in the upper end of the force body so that rotation of the gear hub will likewise rotate the force body.

With the mold open and the force pin and force body axially in line with the corresponding cavity parts, plastic to be molded is placed in the cavity and the mold parts are moved relatively together in axial alignment, preferably by bringing the cavity plate up into cooperation with the force pin and force body, the force plate and stripper plate being relatively against one another, as shown in Figure 1. The molded object 64 is here formed, producing external threads on the object in the internal threads of the cavity.

After completion of molding as shown in Figure 1, the seal between the mold parts is broken by relatively separating the parts as shown in Figure 2, suitably by moving the cavity parts downward with respect to the force pin and force body. The effect of the molding is to produce a slidable interlock of the molded object along the interlock portions 52 or 52' of the force pin, and the molded object moves longitudinally downward along the force pin to the position of Figure 2 but still maintains its interlock with the force pin. Due to the shrinkage of the molded object, the molded object firmly hugs the force pin.

In the next step which begins after Figure 2 and ends with Figure 3, the cavity plate continues to move away from the force plate and stripper plate, and the rack 45 is manipulated to rotate the pinion and pinion hub, thus rotating the force pin and force body together in a direction to unscrew the molded object 64 from the threads in the cavity. During this unscrewing action the interlocks 52 or 52' make the molded object rotate with the force pin and force body, in this sense gripping the molded object in a manner somewhat similar to that of a Phillips head screwdriver. The rate of rotation of the force pin and force body is great enough so that the molded object is completely unscrewed from the cavity before it is removed from the force pin, so that due to the shrinkage of the molded object it remains in position on the lower end of the force pin in Figure 3.

The cavity plate now is suitably reciprocated laterally as well known in the art and as shown for example in the Lay patent so that another charge of preforms can be placed in the cavities. At this point the stripper plate 21 is moved relatively downward as by moving its jack or ram, and the lower edges of the force body engage the molded object and push it off the lower end of the force pin as shown in Figure 4. The molded objects then suitably drop on the bed of the press from which they are swept off into any suitable receptacle when the cavity plate returns to the mold.

Sometimes the molded objects do not drop at this time but are drawn into the force cavity 65 by the axial pull of the force pin. To prevent this, in the preferred embodiment, after moving the stripper plate down to the position of Figure 4, I move it up again so that the work contacts the force pin. Due to the shrinkage which has taken place in the work, the force pin does not reenter the hole in the work, but ejects the work from the force cavity. Then the stripper plate is again moved down to the position of Figure 4. If desired, a safety bar may be carried across to knock off any remaining bolded objects.

The stripper plate is raised to the position of Figure 1 before the next molding.

In view of my invention and disclosure, variations and modifications to meet the individual whim or particular need will doubtless become evident to others skilled in the art, to obtain all or part of the benefits of my invention without copying the method and structure shown, and I, therefore, claim all such insofar as they fall within the reasonable spirit and scope of my claims.

Having thus described my invention, what I claim as new and desire to be secured by Letters Patent is:

1. The method of molding a threaded object from a plastic which shrinks on molding, using a threaded mold cavity, a force pin having a tapered end and a force body surrounding the force pin, which comprises placing said plastic in the mold cavity, relatively moving the threaded mold cavity axially toward the force pin and force body to mold the object by applying pressure to the plastic and thus bring the object into engagement in the threads of the mold cavity, relatively axially separating the mold cavity on the one hand from the force pin and force body on the other hand while maintaining a sliding interlock between the molded object and the force pin and gripping the tapered portion of the force pin by the plastic due to the shrinkage of the plastic, rotating the force pin in a direction to unscrew the molded object from the threads on the mold cavity while continuing to relatively move the mold cavity away from the force pin, maintaining the sliding interlock with the molded object and continuing to grip the force pin by the molded object due to the shrinkage of the molded object, and then relatively moving the force body axially with respect to the force pin toward the molded object to eject the molded object from the tapered portion of the force pin.

2. The method of molding a threaded object from a plastic which shrinks on molding, using a threaded mold cavity, a force pin having a tapered end and a force body surrounding the force pin, which comprises placing said plastic in the mold cavity, relatively moving the threaded mold cavity axially toward the force pin and force body to mold the object by applying pressure to the plastic and thus bringing the object into engagement in the threads of the mold cavity, relatively axially separating the mold cavity on the one hand from the force pin and force body on the other hand while maintaining a sliding interlock between the molded object and the force pin and gripping the tapered portion of the force pin due to the shrinkage of the plastic, rotating the force pin in a direction to unscrew the molded object from the threads of the mold cavity while continuing to relatively move the mold cavity away from the force pin, maintaining the slidable interlock with the molded object and continuing to grip the force pin by the molded object due to the shrinkage of the molded object, relatively moving the force body axially with respect to the force pin toward the molded object until the molded object leaves the tapered portion of the force pin with further shrinkage, and then relatively moving the force body axially in the opposite direction to eject the molded object from the cavity of the force body.

3. In a device for molding threaded objects from a plastic having a tendency to shrink, a mold cavity having a thread, a force pin tapering at the end and cooperating with the mold cavity, the force pin having a longitudinally extending interlock element adapted to maintain sliding interlock with the molded object, a hollow force body surrounding the force pin and cooperating with the force pin and the mold cavity to complete the mold, means for bringing the mold cavity axially toward the force pin and the force body for molding an object, means for relatively moving the mold cavity axially away from the force pin and the force body while maintaining the slidable interlock between the force pin and the molded object and permitting some shrinkage of the molded object which still surrounds the force pin, means for rotating the force pin as the mold cavity moves away and thereby unscrewing the molded object from the threads in the mold cavity while the molded object still grips the force pin due to further shrinkage and means for axially moving the force body with respect to the force pin to push the molded object off the force pin against the gripping caused by the shrinkage.

4. A device of claim 3, in combination with sliding interlock means between the force pin and the force body, rotating the force body when the force pin rotates.

5. In a device for molding threaded objects from plastic having a tendency to shrink, a mold cavity having a thread, a force pin having a tapered end, cooperating with the mold cavity, and having on the force pin longitudinally extending interlock elements adapted to maintain sliding interlock with the molded object, a hollow force body surrounding the force pin and cooperating with the force pin and the mold cavity to complete the mold, means for bringing the mold cavity axially toward the force pin and the force body for molding the object, means for relatively moving the mold cavity axially away from the force pin and the force body while maintaining the slidable interlock between the force pin and the molded object and permitting the molded object to partially shrink, means for rotating the force pin as the mold cavity moves away and thereby unscrewing the molded object from the threads in the mold cavity and allowing the molded object further to shrink, means for moving the force body axially with respect to the force pin to push the molded object off the force pin and allow the molded object to complete its shrinkage, and means for relatively moving the force body axially with respect to the force pin to push the force pin against the shrunk molded object and eject the force pin from the force body.

References Cited in the file of this patent
UNITED STATES PATENTS

| | | |
|---|---|---|
| 1,801,613 | Ratzer | Apr. 21, 1931 |
| 1,944,571 | Rahm | Jan. 23, 1934 |
| 2,339,443 | Wilson | Jan. 18, 1944 |